May 7, 1963     F. C. EASTHAM     3,088,525
CLAMP FOR PLOW ATTACHMENT FOR HAND-STEERED TRACTOR
Filed June 7, 1961
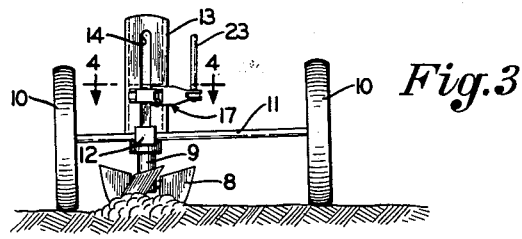
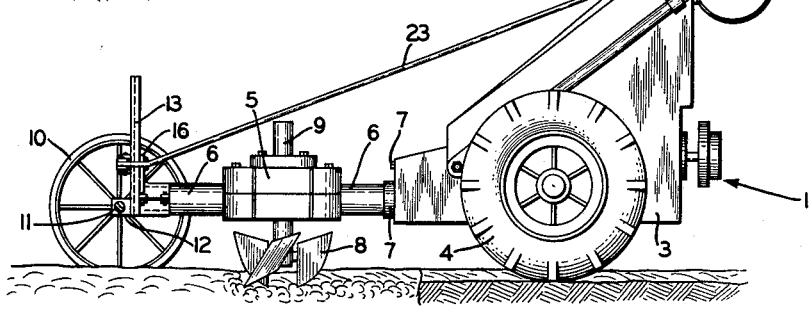
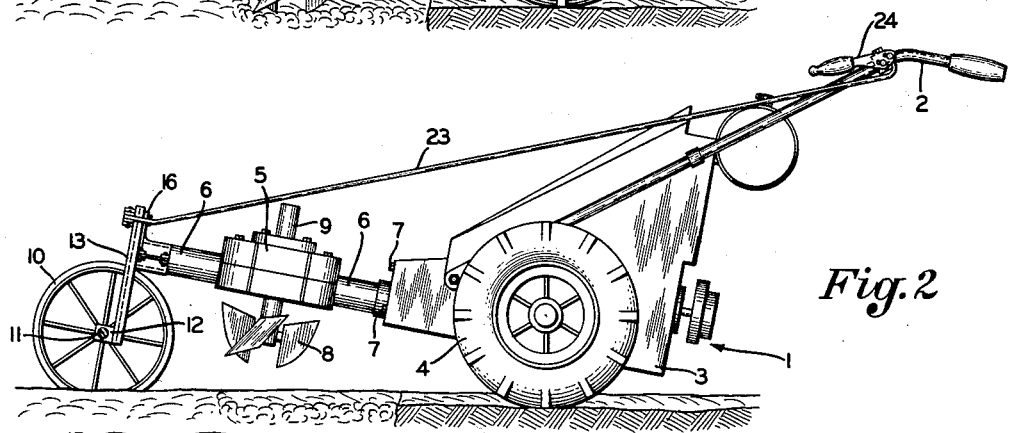
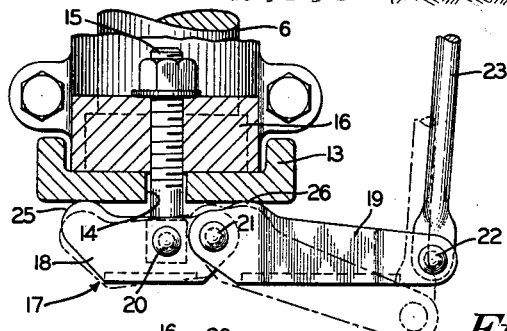
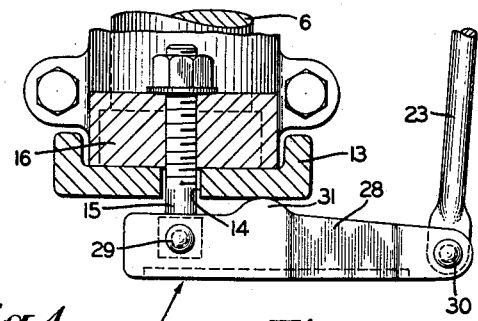
INVENTOR.
Frederick C. Eastham
BY
Frease, Bishop, Johns & Schick
ATTORNEYS Patented May 7, 1963

3,088,525
CLAMP FOR PLOW ATTACHMENT FOR
HAND-STEERED TRACTOR
Frederick C. Eastham, R.D. 2, Box 291, Beloit, Ohio
Filed June 7, 1961, Ser. No. 115,342
4 Claims. (Cl. 172—259)

This invention relates to a clamp for a hand-steered tractor and more particularly it pertains to a clamp for a plow attachment for a power-driven, hand-steered tractor, or garden tractor. A power-driven tractor which is ordinarily steered by an operator who walks behind the tractor may be used with a variety of attachments. One attachment includes a rotary plow which is mounted on an axis perpendicular to the direction of movement of the plow. The attachment, which is mounted on the forward end of the tractor, offers no unusual operational problems during the plowing of a furrow. However, at the end of a furrow it is necessary to turn the tractor with the plow rotating. In order to prevent the plow from plowing the soil during the turning operation, it is necessary for the operator to raise the plow out of the soil by lowering the handle bars at the rear of the tractor. Such a maneuver is difficult, particularly on rough terrain.

It has been found that the rotary plow may be adjusted between lower and upper levels corresponding to maximum depth of plow and to complete withdrawal of the plow from the soil. Moreover, such adjustments may be provided automatically by the use of a clamp which is manipulated by a lever mounted on one handle bar of the tractor.

Although the primary advantage of the manually operated clamp is to hold the plow above the soil during the turning operation of the tractor at the end of a furrow, the device has the additional advantage of permitting the operator to set the rotary plow attachment at any desired depth of cut.

Accordingly, it is a general object of this invention to provide a plow clamp for a hand-steered tractor which facilitates turning of the tractor at the end of a furrow.

It is another object of this invention to provide a plow clamp for a hand-steered tractor by which the depth of cut of the plow may be set to any desired level.

It is another object of this invention to provide a plow clamp for a hand-steered tractor, which clamp, being located at the forward end of the plow, is readily adjusted by manual manipulation of a lever at the rear of the tractor.

These and other objects and advantages, apparent to those skilled in the art from the following description and claims, may be obtained, the stated results achieved, and the described difficulties overcome, by the apparatus, constructions, arrangements, combinations, subcombinations, elements, parts, and principles, which comprise the present invention, the nature of which is set forth in the foregoing general statements, preferred embodiments of which—illustrative of the best modes in which applicant has contemplated applying the principles—are set forth in the following description and shown in the drawings, and which are particularly and distinctly pointed out and set forth in the appended claims forming part hereof.

The preferred embodiments of the invention are illustrated by way of example in the accompanying drawings, wherein:

FIGURE 1 is an elevational view of a hand-steered tractor having a rotary plow attachment mounted thereon in position for plowing;

FIG. 2 is an elevational view of the tractor showing the plow attachment in the raised position out of operation;

FIG. 3 is a front end view of the plow support wheels;

FIG. 4 is a horizontal sectional view taken on the line 4—4 of FIG. 3;

FIG. 5 is an enlarged fragmentary view of the front end of the clamp; and

FIG. 6 is a horizontal sectional view similar to that of FIG. 4 showing another embodiment of the clamp.

Similar numerals refer to similar parts throughout the several views of the drawing.

In FIG. 1 a tractor is generally indicated at 1. It includes a pair of handle bars 2 (one being shown in the drawing) and an engine 3 which drives a pair of wheels 4 (one being shown in the drawing). At the forward end of the tractor 1 a rotary plow 5 is mounted on an elongated cylindrical shaft 6 which is attached to the tractor by bolts 7. The plow 5 includes preferably four cutting blades 8 which are secured to the lower end of a rotatable shaft 9 which is in turn operatively connected to a drive shaft (not shown) extending from the tractor 1 through the cylindrical shaft 6.

At the left end of the shaft 6 as viewed in FIGS. 1 and 2, a pair (FIG. 3) of gauge wheels 10 are mounted on an axle 11 to regulate the depth of furrow as well as to support the weight of the plow 5. The axle 11 is mounted in a block 12, which block is secured to the lower end of a vertical bracket 13. As shown in FIG. 4, the bracket 13 has a channel configuration and is provided with an elongated slot 14 through which extends a bolt 15 which is secured to a plate 16 mounted on the end of the shaft 6.

As shown in FIGS. 3, 4, and 5, a clamp means 17 is mounted on the end of the bolt 15 on the side of the bracket 13 remote from the plate 16. The clamp means includes a pair of clamping levers 18 and 19 which together with the bolt 15 tighten the bracket 13 against the plate 16 when the plow is in the upper position, as shown in FIG. 2.

More particularly, the clamping lever 18 is pivotally mounted by a pin 20 at the outer end of the bolt 15 and the clamping lever 19 is pivotally secured by a pin 21 to one side of the lever 18. In addition, the lever 19 is pivotally mounted by a pin 22 to an elongated link 23 which, as shown in FIGS. 1 and 2, extends to one of the handle bars 2 of the tractor where the other end of the link is secured to a handle lever 24 which is pivotally mounted on one of the handle bars 2.

As shown in FIG. 4, the lever 18 includes a rounded protruding portion 25. Likewise, the lever 19 includes a similar rounded protruding portion 26 which together with the portion 25 is brought into clamping engagement with one side of the bracket 13 and thereby cooperates with the bolt 15 to tighten the other side of the bracket against the plate 16.

During the normal plowing operation, the tractor 1 with the plow attachment 5 secured thereon is disposed in the position of FIG. 1, with the handle lever 24 either in the upright position as shown, or in the clamped position which is preferred. In the position of FIG. 1 the link 23 is forward in the broken line position of FIG. 4 so that the clamping levers 18 and 19 are released and gravity holds the shaft 6 at the lowermost position of the bracket 13. When the end of a furrow is reached, however, the operator pushes down on the handle bars 2, thereby rotating the tractor about the axle of the wheels 4, to raise the plow 5 ultimately to the position of FIG. 2, bringing the left end of the shaft 6 to the upper end of the bracket 13.

It is understood that during that operation the wheels 10 remain on the ground due to gravity, permitting the plate 16 to slide on the bracket 13. The handle lever 24 is then moved from the position of FIG. 1 to that of FIG. 2, thereby clamping the plow in the raised position and the operator is then free to turn the tractor 1 around in order to bring the plow 5 into position for another furrow.

Another embodiment of the clamping means 17 is shown at 27 in FIG. 6, which includes a clamping lever 28, one end of which is pivotally mounted by a pin 29 to the bolt 15 and the other end of which is pivotally secured by a pin 30 to the end of the link 23. The clamping lever 28 includes a rounded protruding portion 31 similar to the portion 26 of the lever 19, and is manipulated in the same manner to clamp the bracket 13 against the plate 16.

The device of the present invention avoids prior art difficulties by providing manually operated means for facilitating operation of a rotary plow attachment for a power-driven, hand-steered tractor. Among other things, operation of the assembly is facilitated by providing a clamp for holding the plow in a raised position and out of possible contact with the soil during the turning of the tractor at the end of a furrow. In addition, the clamp may be used for holding the plow at any desired depth between the uppermost and lowermost positions, as shown in FIGS. 2 and 1, to adjust the depth of cut of the plow during the entire plowing operation.

Finally, the clamping means is provided with a manually operated handle lever which is conveniently located on one handle bar at the position of the operator, which enables manipulation of the clamp at any desired time.

When the tractor is turned and the plow is brought into alignment for plowing another furrow, the operator simply moves the handle lever from the position of FIG. 2 to that of FIG. 1 and the weight of the tractor and plow attachment at the forward end of the tractor causes the plow to drop to the position of FIG. 1. It is understood, of course, that any other gardening tool, such as a cultivator or a disk harrow, may be used instead of the rotary plow.

In the foregoing description certain terms have been used for brevity, clearness and understanding, but no unnecessary limitations have been implied therefrom as such words are used for descriptive purposes and are intended to be broadly construed.

Moreover, the embodiments of the improved construction illustrated and described herein are by way of example and the scope of the present invention is not limited to the exact construction shown.

Having now described the invention, construction, operation and use of preferred embodiments thereof and the advantageous, new and useful results obtained thereby; the new and useful clamp for plow attachment for hand-steered tractor and reasonable mechanical equivalents thereof obvious to those skilled in the art are set forth in the appended claims.

What is claimed is:

1. In a garden tractor having a pair of wheels, a power unit for driving the wheels, a pair of handle bars extending upwardly and rearwardly from the wheels, a longitudinal shaft extending forwardly from the wheels, and a gardening implement mounted on the shaft between the power unit and wheel means; the improvement comprising gauge-wheel means vertically movably mounted on the forward end of the shaft, means for clampingly mounting the shaft on the gauge-wheel means including a vertical bracket, the clamping means including bolt means attached to one end of the shaft and extending from one side of the bracket to the other side thereof, a clamp lever attached to the bolt means and movable between clamping and unclamping positions on the bracket, and a handle lever mounted on one of the handle bars and operatively connected to the clamp lever.

2. The clamp as set forth in claim 1 in which the bracket includes a longitudinal slot, in which said bolt means is attached at one end to the shaft and extends through the slot, and in which the clamp lever is pivotally attached to the other end of the bolt means on the other side of the bracket.

3. The clamp as set forth in claim 1 in which the clamp lever includes a protruding portion engageable with one side of the bracket in the clamping position.

4. The clamp as set forth in claim 1 in which the clamp includes a pair of clamp levers and a clamp plate, in which the clamp plate is mounted on the end of the shaft, in which the bracket is slidably mounted on the plate and includes a longitudinal slot, in which the bolt means is secured at one end on the plate and extends through the slot, and in which the pair of clamp levers are pivotally mounted on the other end of the bolt means on the side of the bracket opposite that of the plate for movement between clamping and unclamping positions of the bracket on the plate.

References Cited in the file of this patent

UNITED STATES PATENTS

| | | |
|---|---|---|
| 469,168 | Nicholson | Feb. 16, 1892 |
| 1,174,986 | Jeschke | Mar. 14, 1916 |
| 1,396,683 | Hall | Nov. 8, 1921 |

FOREIGN PATENTS

| | | |
|---|---|---|
| 650,522 | France | Sept. 24, 1928 |